(12) United States Patent
Yang et al.

(10) Patent No.: US 10,383,115 B2
(45) Date of Patent: Aug. 13, 2019

(54) TRANSPORT BLOCK DESIGN

(71) Applicant: QUALCOMM Incorporated, San Diego, CA (US)

(72) Inventors: Yue Yang, San Diego, CA (US); Aziz Gholmieh, Del Mar, CA (US); Srinivasan Balasubramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 103 days.

(21) Appl. No.: 15/638,918

(22) Filed: Jun. 30, 2017

(65) Prior Publication Data
US 2018/0176910 A1    Jun. 21, 2018

Related U.S. Application Data

(60) Provisional application No. 62/436,843, filed on Dec. 20, 2016.

(51) Int. Cl.
*H04W 72/04* (2009.01)
*H04L 5/00* (2006.01)
(Continued)

(52) U.S. Cl.
CPC ....... *H04W 72/0446* (2013.01); *H04L 5/0003* (2013.01); *H04W 72/0453* (2013.01);
(Continued)

(58) Field of Classification Search
CPC ..... H04L 5/0003; H04L 5/001; H04L 5/0023; H04L 5/0044; H04L 5/0037;
(Continued)

(56) References Cited

U.S. PATENT DOCUMENTS 9,060,365 B2    6/2015  Gorokhov et al.
2007/0286149 A1*  12/2007  Yamamoto ........ H04W 72/1263
                                                370/345
(Continued)

FOREIGN PATENT DOCUMENTS

| EP | 2244515 A1 | 10/2010 |
|---|---|---|
| EP | 2408252 A1 | 1/2012 |
| WO | 2007092245 A2 | 8/2007 |

OTHER PUBLICATIONS

"ETSI TS 136 211 V10.1.0", Apr. 2011,European Telecommunications Standards Institute, p. 16 https://www.etsi.org/deliver/etsi_ts/136200_136299/136211/10.01.00_60/ts_136211v100100p.pdf.*

(Continued)

*Primary Examiner* — Maharishi V Khirodhar
*Assistant Examiner* — Kenneth P Hunt
(74) *Attorney, Agent, or Firm* — Patterson & Sheridan, LLP

(57) ABSTRACT

Certain aspects of the present disclosure relate to methods and apparatus for generating and communicating transport blocks. Certain aspects provide a method for allocating an ordered set of packets to a plurality of layers across a plurality of time resources. The method includes allocating one or more packets of the ordered set of packets in order across each of the plurality of layers prior to allocating packets of the ordered set of packets to each of the time resources of any one of the plurality of layers. The method further includes transmitting the plurality of layers.

26 Claims, 10 Drawing Sheets

(51) Int. Cl.
*H04W 84/04* (2009.01)
*H04B 7/04* (2017.01)
*H04W 72/00* (2009.01)

(52) U.S. Cl.
CPC ............ *H04B 7/04* (2013.01); *H04L 5/001* (2013.01); *H04L 5/0023* (2013.01); *H04L 5/0044* (2013.01); *H04W 72/00* (2013.01); *H04W 84/042* (2013.01)

(58) Field of Classification Search
CPC ......... H04W 72/0446; H04W 72/0453; H04W 72/00; H04W 84/042; H04W 72/1268; H04W 72/1263; H04W 72/02; H04B 7/04
See application file for complete search history.

(56) References Cited

U.S. PATENT DOCUMENTS

| | | | |
|---|---|---|---|
| 2008/0075109 A1* | 3/2008 | Zangi | H04W 72/06 370/458 |
| 2008/0165893 A1* | 7/2008 | Malladi | H04J 13/0074 375/299 |
| 2012/0014242 A1* | 1/2012 | Kim | H04B 7/0413 370/203 |
| 2012/0014298 A1* | 1/2012 | Wachi | H04W 72/1231 370/310 |
| 2012/0057547 A1* | 3/2012 | Lohr | H04L 5/0007 370/329 |
| 2014/0003374 A1 | 1/2014 | Kuo | |
| 2016/0323777 A1 | 11/2016 | Pan et al. | |
| 2017/0026296 A1 | 1/2017 | Kozat et al. | |
| 2017/0070319 A1 | 3/2017 | Jöngren et al. | |

OTHER PUBLICATIONS

"LTE Advanced—Layer Mapping." Share Technote, Retrieved Nov. 30, 2018, http://www.sharetechnote.com/html/LTE_Advanced_LayerMapping.html.*
International Search Report and Written Opinion—PCT/US2017/063979—ISA/EPO—dated Mar. 28, 2018.

* cited by examiner

TRANSPORT BLOCK DESIGN

CROSS-REFERENCE TO RELATED APPLICATIONS

This application claims the benefit of U.S. Provisional Patent No. 62/436,843, filed Dec. 20, 2016. The content of the provisional application is hereby incorporated by reference in its entirety.

INTRODUCTION

The present disclosure relates generally to communication systems, and more particularly, to methods and apparatus for generating and communicating transport blocks.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an e NodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, gNodeB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for allocating an ordered set of packets to a plurality of layers across a plurality of time resources. The method includes allocating one or more packets of the ordered set of packets in order across each of the plurality of layers prior to allocating packets of the ordered set of packets to all of the time resources of any one of the plurality of layers. The method further includes transmitting the plurality of layers.

Certain aspects provide a device. The device includes a memory and a processor. The memory and the processor are configured to allocate one or more packets of an ordered set of packets in order across each of a plurality of layers prior to allocating packets of the ordered set of packets to all time resources of any one of the plurality of layers. The memory and the processor are further configured to transmit the plurality of layers.

Certain aspects provide a device. The device includes means for allocating one or more packets of an ordered set of packets in order across each of a plurality of layers prior to allocating packets of the ordered set of packets to all time resources of any one of the plurality of layers. The user equipment further includes means for transmitting the plurality of layers.

Certain aspects provide a computer readable medium having instructions stored thereon for performing a method for allocating an ordered set of packets to a plurality of layers across a plurality of time resources. The method includes allocating one or more packets of the ordered set of packets in order across each of the plurality of layers prior to allocating packets of the ordered set of packets to all of the time resources of any one of the plurality of layers. The method further includes transmitting the plurality of layers.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
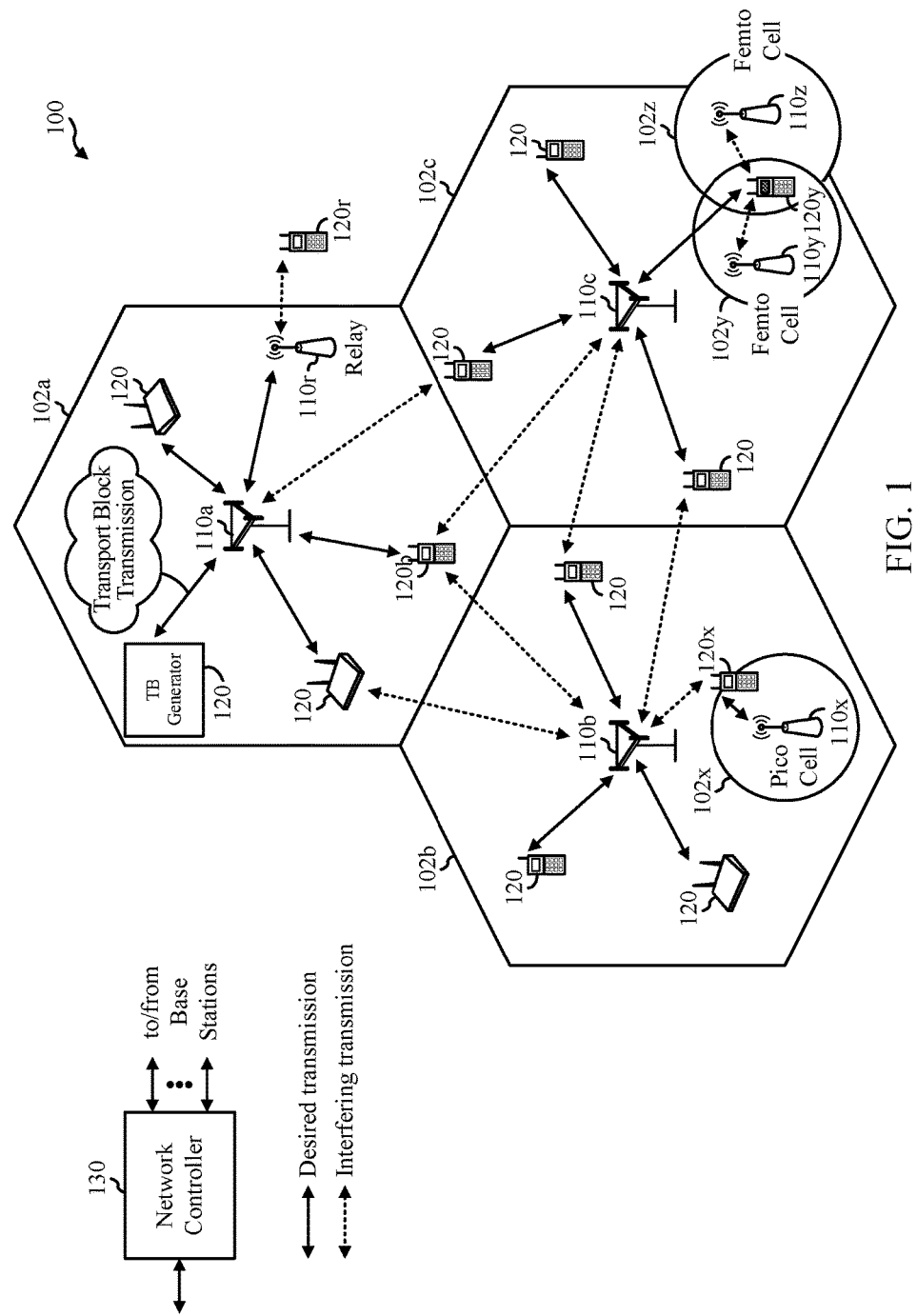
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

Aspects of the present disclosure relate to building and communicating transport blocks (TBs). In particular, in some aspects, a TB may correspond to a unit of transmission per one or more layers (e.g., frequency carriers corresponding to frequency ranges and/or spatial resources) per TTI from a device to another device (e.g., from an eNB to a UE or vice versa). Certain aspects of the present disclosure provide techniques for allocating an ordered set of packets to a plurality of layers (e.g., of one or more TBs) across a plurality of time resources (e.g., symbols). For example, certain aspects provide techniques for allocating an ordered set of packets to a plurality of transport blocks each comprising a separate layer. Certain aspects provide techniques for allocating an ordered set of packets to a plurality of layers of a single transport block.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

EXAMPLE WIRELESS COMMUNICATIONS SYSTEM

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, gNB, gNodeB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

In certain aspects, as shown, a BS 110 may be configured to transmit an ordered set of packets in one or more transport blocks to a UE 120, or a UE 120 may be configured to generate using a TB generator and transmit an ordered set of packets in one or more transport blocks to a UE 120, according to certain aspects discussed herein.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
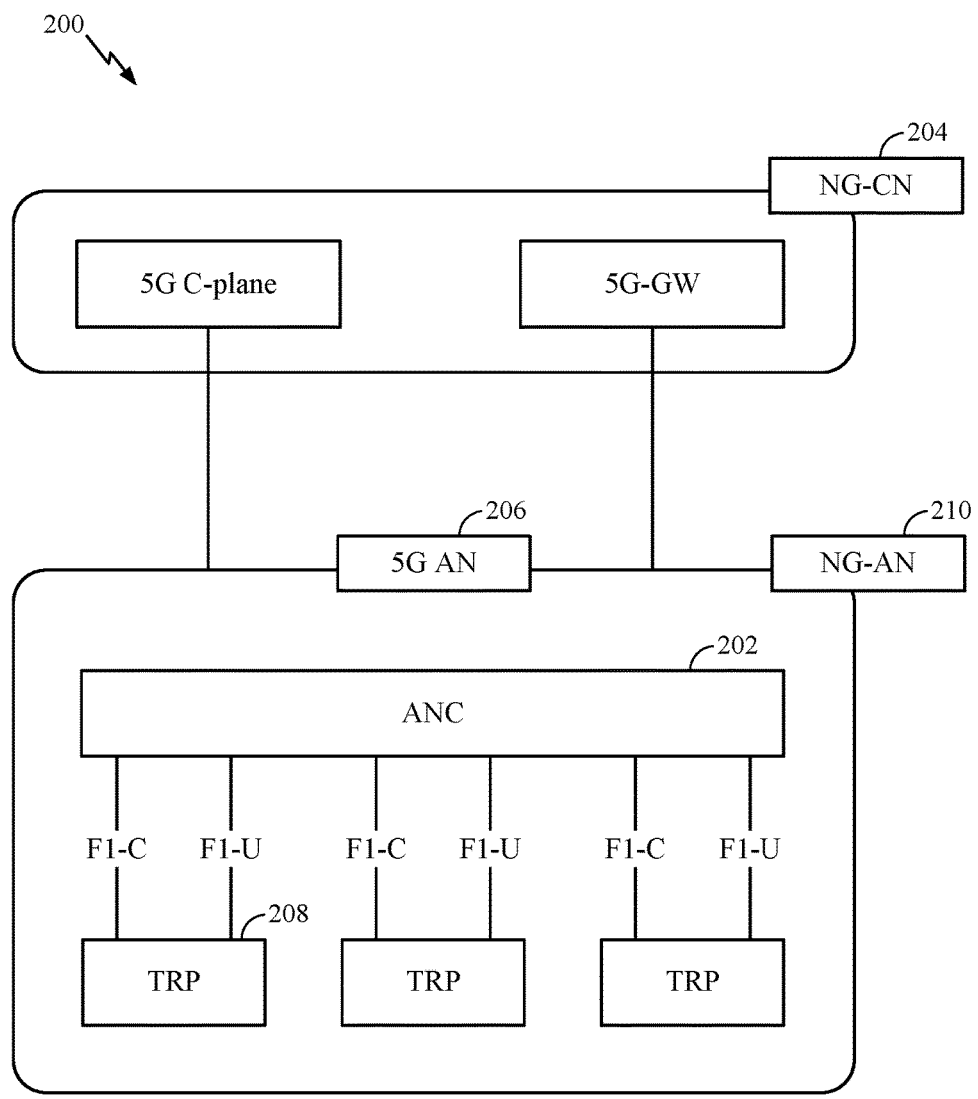
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/ or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/ present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
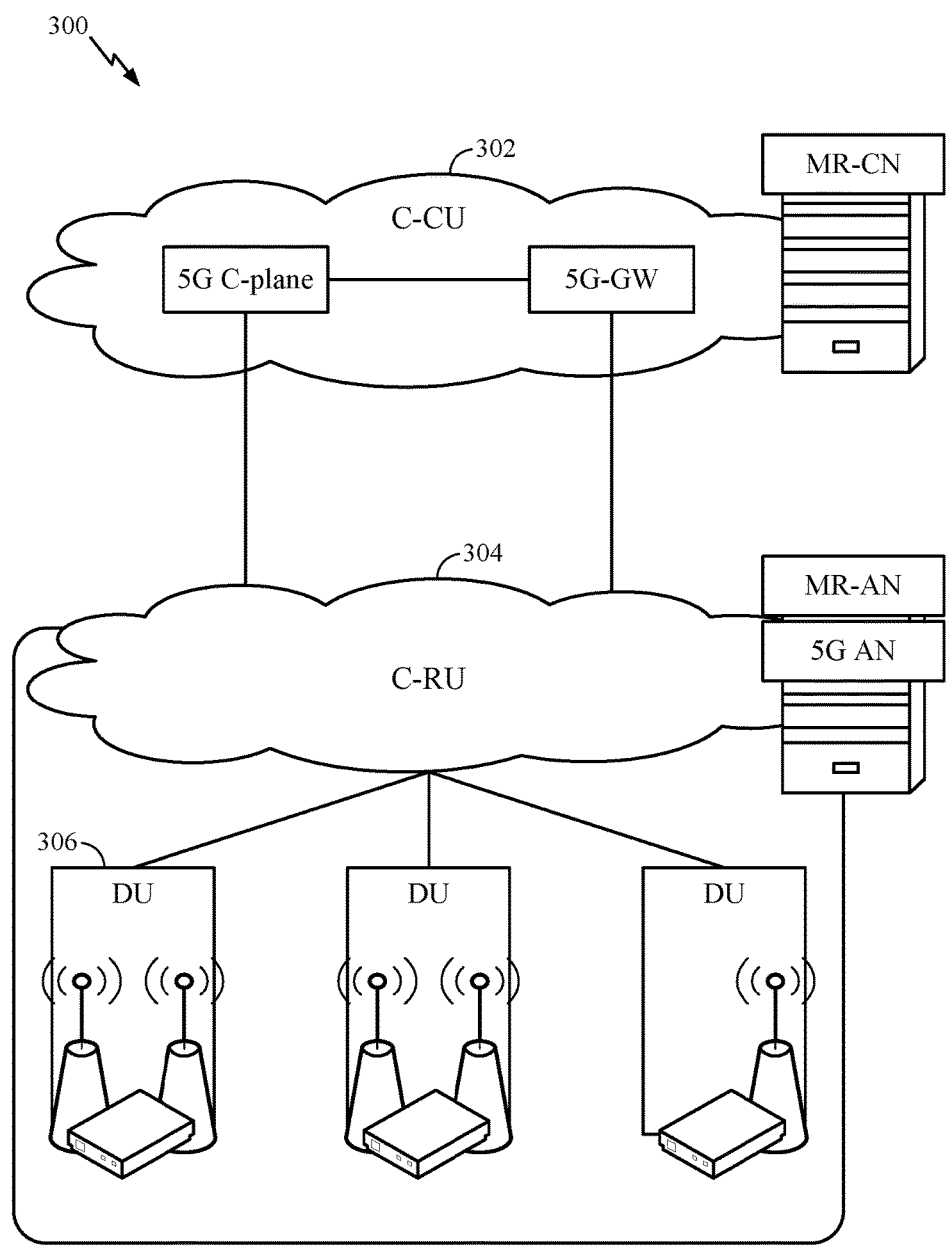
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
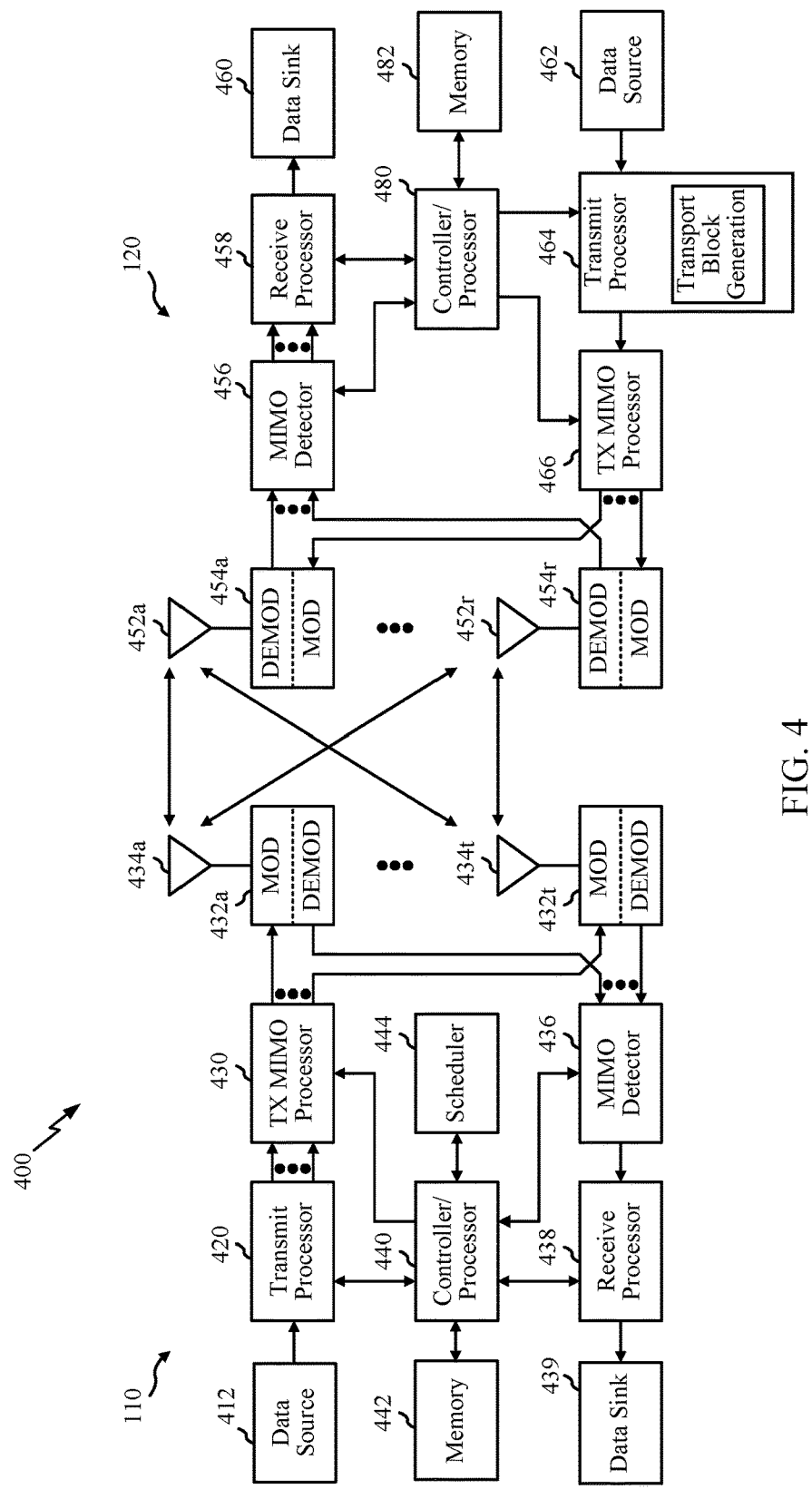
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIG. 11.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The transmit processor 464 may also generate transport blocks for transmission according to the techniques discussed herein. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct processes for the techniques described herein. The processor 480 and/or other processors and modules at the UE 120 may also perform or direct, e.g., the execution of the functional blocks illustrated in FIG. 11, and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
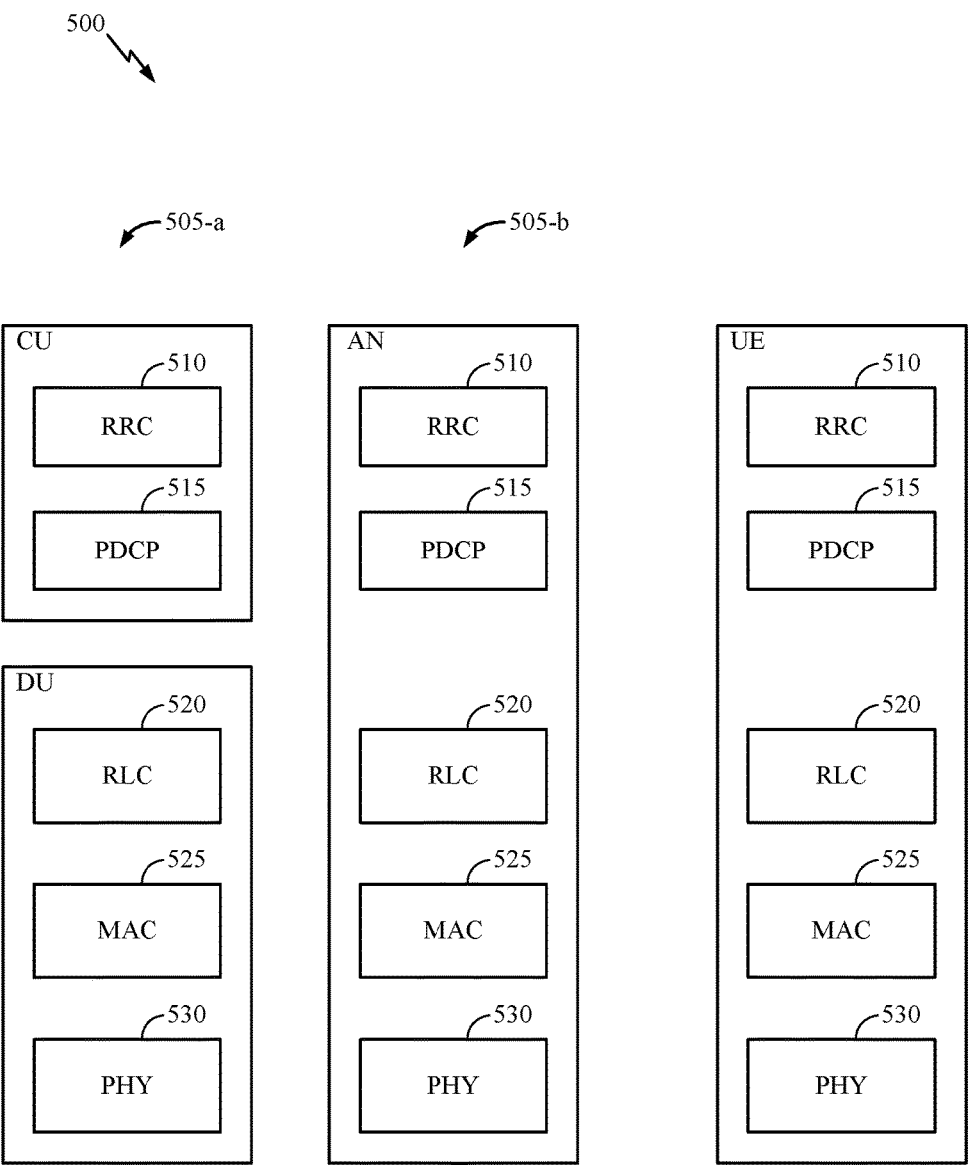
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-*b* may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
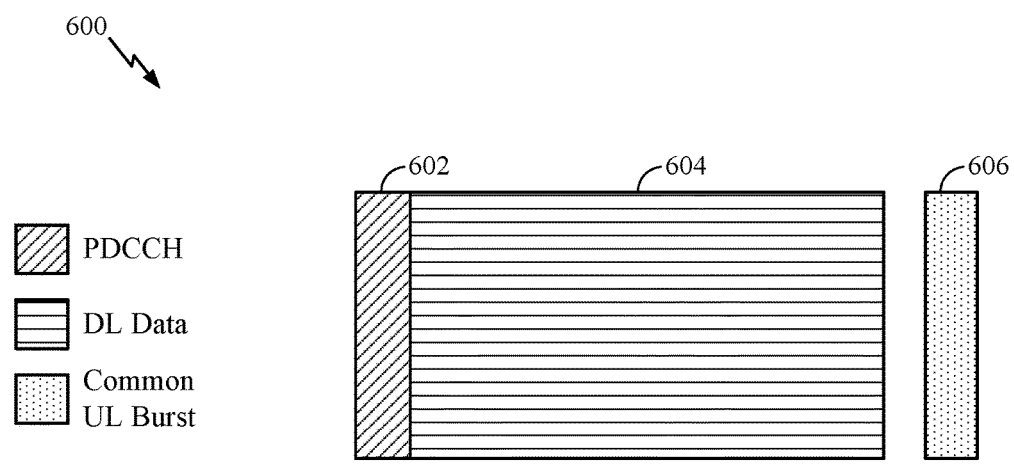
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
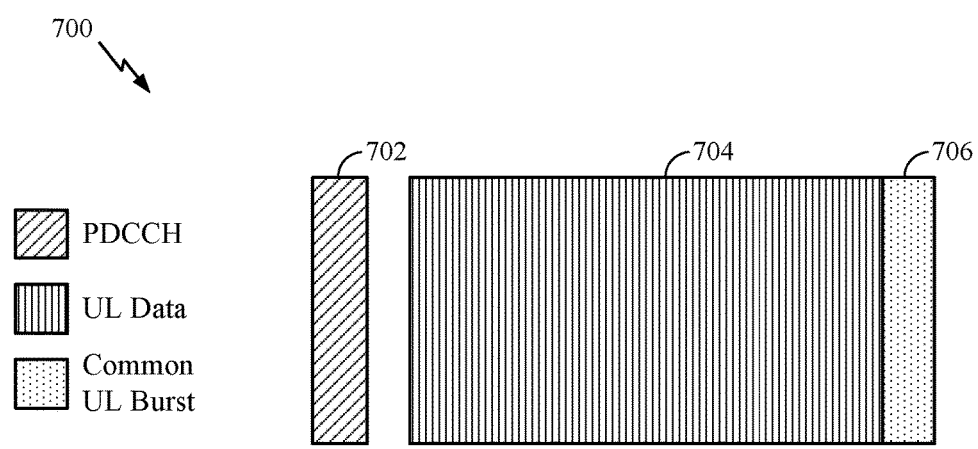
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

EXAMPLE TRANSPORT BLOCK DESIGN

As discussed above, a UE (e.g., UE 120) may transmit data on an uplink as a transport block (TB). In particular, the UE 120 may receive an uplink grant from a BS (e.g., BS 110) indicating a number of TBs the UE 120 can transmit to the BS 110 and the size of each TB. The UE 120, accordingly, generates TBs and transmits them to the BS 110 on the resources (e.g., layers, such as frequency carriers and/or spatial layers, and time resources (e.g., symbols)) allocated in the uplink grant. In some aspects, the UE 120 transmits one or more TBs to the BS 110 at a time. In certain aspects, each TB may be sent on one or more different layers from the UE 120 to the BS 110 at the same time (e.g., on the same time resources) of the uplink. For example, in certain aspects, each of a plurality of transport blocks comprises a separate layer. In certain aspects, each transport block comprises a plurality of layers.

For example, the UE 120 may have packets (e.g., PDCP packets) corresponding to one or more logical channels (e.g., control channels, traffic channels, PUCCH, PUSCH, etc.) to transmit to the BS 110. The UE 120 may use the packets to build the one or more TBs.

Figure 8:
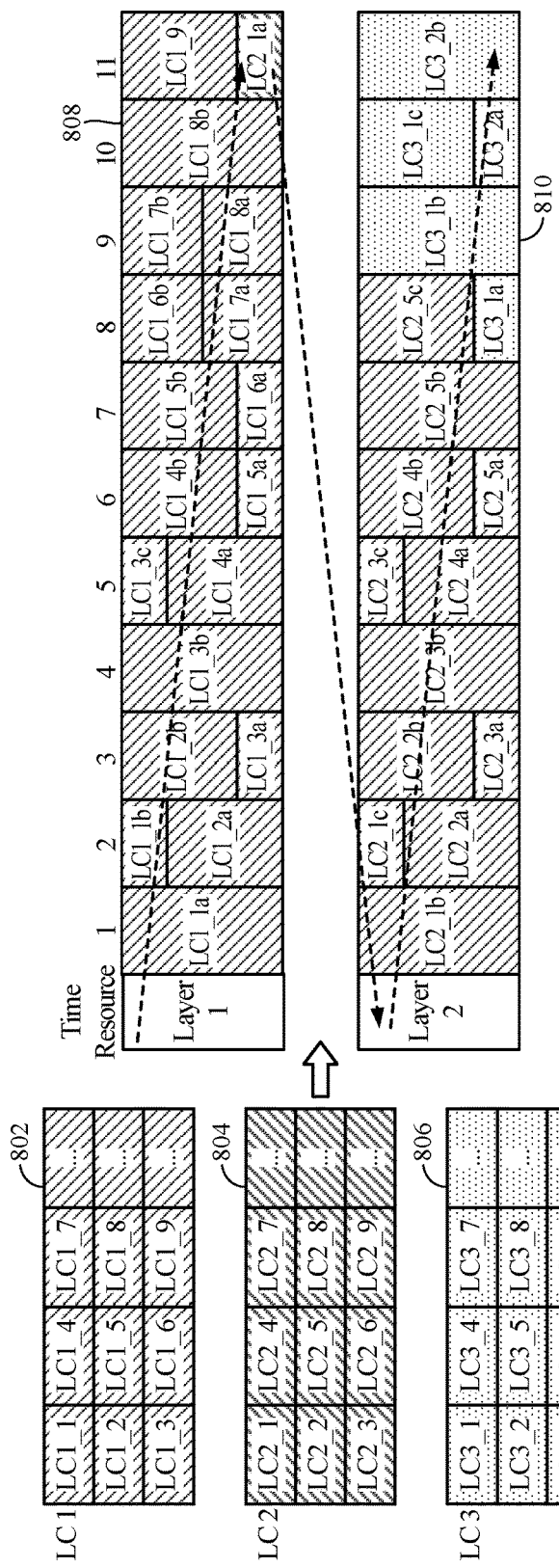
FIG. 8 illustrates an example of layers of one or more transport blocks, in accordance with certain aspects.

FIG. 8 illustrates an example of layers 808 and 810 (e.g., of one or more TBs) built by the UE 120, in accordance with certain aspects. In this example, the UE 120 has packets 802, 804, and 806 corresponding to three logical channels, shown as logical channels LC1, LC2, and LC3, respectively, to transmit to the BS 110. The packets 802 corresponding to LC1 include packets LC1_1, LC1_2, . . . LC1_9. The packets 804 corresponding to LC2 include packets LC2_1, LC2_2, . . . LC2_9. The packets 806 corresponding to LC3 include packets LC3_1, LC3_2, . . . LC3_9. It should be noted that in certain aspects, there may be fewer or greater number of logical channels, and fewer or greater number of packets per logical channel. Further, the number of packets per logical channel may be the same or different.

In certain aspects, the UE 120 (e.g., the MAC layer of the UE 120) determines what packets from each logical channel should be transmitted in the uplink grant and in what order. For example, the UE 120 may prioritize certain packets (e.g., from certain logical channels) over other packets due to QoS, latency, etc., requirements associated with certain packets. In the example shown with respect to FIG. 8, the UE 120 has been granted transmission on two layers 808 and 810 in the uplink, each having a duration of 11 time resources. Further, the UE 120 has prioritized in order and selected transmission of packets LC1_1-LC1-9, LC2_1-LC2_5, and LC3_1-LC3_2 in layers 808 and 810. In some aspects, the ordering of packets is on a logical channel by logical channel basis as shown. In some aspects, the ordering of packets may not be on a logical channel by logical channel basis. In certain aspects, the UE 120 then determines the placement of each of the packets selected for transmission in layers 808 and 810. It should be noted that though two layers 808 and 810 are shown, the UE 120 may build and transmit additional layers (e.g., in the same one or more TBs, or additional TBs) simultaneously according to the techniques discussed herein.

In certain aspects, in order to build the one or more TBs, the UE 120 allocates the packets 802, 804, and 806 to the layers 808 and 810 of the one or more TBs. In particular, as shown, each of layers 808 and 810 are allocated on the same time resources 1-11, but on different layers. As shown in the aspects described with respect to FIG. 8, the UE 120 completely builds one layer before building a next layer with packets in order. In particular, as shown, the UE 120 builds layer 808 before building layer 810. In particular, the UE 120 first allocates packets in order to a single layer, before allocating packets to another layer.

In particular, as shown, the UE 120 allocates packets LC1_1-LC1_9 from LC1 to layer 808 in order across time resources 1-11. After allocating packets LC1_1-LC1_9 to layer 808, there are still resources available in layer 808, so the UE 120 allocates a portion of packet LC2_1 (shown as LC2_1a) of LC2 to layer 808. Continuing, the UE 120 then starts building layer 810 including the remaining selected packets from LC2 and LC3 in order as shown. As shown, some of the packets span more resources in the layer 808 than are available in a single time resource of the layer 808. Accordingly, in some aspects, the packets are split between time resources. Portions of packets are denoted as LCX_Ya, LCX_Yb, LCX_Yc, . . . , etc.

In certain aspects, in order to build and transmit the packets to the BS 110, the UE 120 (e.g., PHY layer of UE 120) pulls the packet data from memory (e.g., dynamic random access memory (DRAM), off-chip memory, off-die memory, etc.) and then transmits the packets on the corresponding resources of the TBs. In particular, in certain aspects, the MAC layer of UE 120 sends packet data from memory to the PHY layer of UE 120. In certain aspects, it may be beneficial to pull packet data for each of the layers of one or more TBs of a time resource in parallel from memory in order to transmit them more efficiently. In particular, processing each layer in parallel may reduce latency in building and transmitting the layers.

However, in certain aspects, since packets are assigned to a prior layer (e.g., of the same or a prior TB) before assigning packets to a subsequent layer (e.g., of a same or subsequent TB), the UE 120 needs to logically determine the packet allocation to the prior layer (e.g., of the same or a prior TB) before being able to determine the packet allocation to the subsequent layer (e.g., of a same or subsequent TB). For example, the UE 120 would need to logically allocate packets LC1_1-LC1_9 and the portion of a packet LC2_1a to layer 808, before being able to determine that the first portion of a packet allocated to layer 810 is LC2_1b. Thus, the UE 120 does not know which data it needs from memory for the first time resource, until each of the packets or portions of packets are allocated to the first time resource for each layer. Therefore, the UE 120 cannot process the layers in parallel. Instead, serially waiting until the UE 120 makes such a determination to retrieve packets from memory may cause delay or latency in transmission on the uplink from the UE 120 to the BS 110.

Accordingly, in some aspects, packets or portions of packets may be pre-fetched from memory and stored in a buffer (e.g., on-chip memory, cache, on-die memory, etc.) that has a lower latency for the PHY layer of the UE 120 to retrieve the data. However, as discussed, the UE 120 may not have sufficient information to know which packets to buffer for a first time resource for each layer until after the packets are fetched from memory. Accordingly, in certain aspects, with respect to the layer building process discussed with respect to FIG. 8, the UE 120 may need to pre-fetch an entire TTI worth of packets (e.g., enough packets to allocate to all layers (e.g., of one or more TBs) of the uplink grant) in order at a time. The UE 120 may then be able to utilize the pre-fetched packets to more quickly process the layers in parallel.

In certain aspects, including a buffer with a capacity to store an entire TTI worth of packets may be costly (e.g., parts costs, die space, etc.). Accordingly, certain aspects discussed herein relate to techniques for building layers (e.g., of a same TB or of multiple TBs) that reduce the size of a buffer used for pre-fetching packets, while also allowing processing of layers in parallel.

Figure 9:
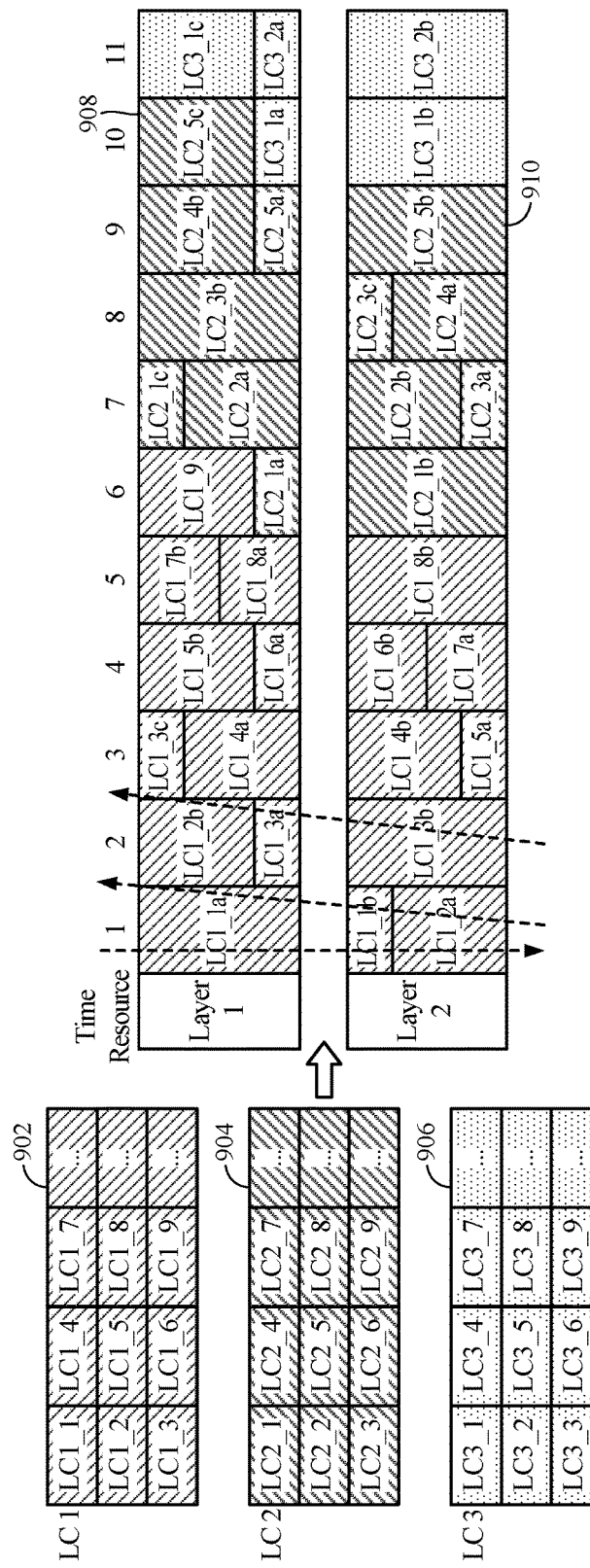
FIG. 9 illustrates an example of layers of one or more transport blocks, in accordance with certain aspects.

FIG. 9 illustrates an example of layers 908 and 910 (e.g., of one or more TBs) built by the UE 120, in accordance with certain aspects. Similar to FIG. 8, the UE 120 has packets 902, 904, and 906 corresponding to three logical channels, shown as logical channels LC1, LC2, and LC3, respectively, to transmit to the BS 110. The packets 902 corresponding to LC1 include packets LC1_1, LC1_2, . . . LC1_9. The packets 904 corresponding to LC2 include packets LC2_1, LC2_2, . . . LC2_9. The packets 906 corresponding to LC3 include packets LC3_1, LC3_2, . . . LC3_9. It should be noted that in certain aspects, there may be fewer or greater number of logical channels, and fewer or greater number of packets per logical channel. Further, the number of packets per logical channel may be the same or different. The UE 120 may prioritize transmission of the packets as discussed with respect to FIG. 8.

Unlike as described with respect to FIG. 8, however, in certain aspects, the UE 120 is configured to build layers in parallel, instead of building one layer before building the next layer. In particular, as shown, the UE 120 allocates packets to one time resource across multiple layers, before allocating packets to a subsequent time resource. Accordingly, the UE 120 allocates packets in order to each of the plurality of layers before packets are allocated to all of the time resources of any given layer. For example, as shown, the UE 120 builds the first time resource of layer 908 and 910 before building the second time resource of layer 908 and 910. In particular, as shown the UE 102 allocates packets in order (e.g., from one logical channel) across layers 908 and 910, time resource by time resource. For example, UE allocates a portion of a packet LC1_1a to time resource 1 of layer 908, a remaining portion of packet LC1_1b to time resource 1 of layer 910, and a portion of a packet LC1_2a to time resource 1 of layer 910 before allocating the remaining portion of a packet LC1_2b to time resource 2 of layer 908. In particular, in certain aspects shown with respect to FIG. 9, packets and portions of packets are allocated across layers time resource by time resource in order.

By allocating the packets in order across layers time resource by time resource, the UE 120 (e.g., MAC layer of the UE 120) can retrieve from memory and send (e.g., to the PHY layer of the UE 120 for transmission) packets on a time resource by time resource basis. In particular, the UE 120 has sufficient information to know how to allocate packets to a first time resource across multiple layers (e.g., of a same or multiple TBs) without having to logically allocate packets to a prior layer (e.g., of the same or a prior TB) before allocating packets to a subsequent layer (e.g., of a same or subsequent TB). Accordingly, the UE 120 can build and transmit layers (e.g., of a same or multiple TBs) in parallel on a time resource by time resource basis. Further, since the UE 120 knows which data it generally needs to generate and transmit each time resource, the UE 120 may include a buffer with reduced size as compared to the aspects described with respect to FIG. 8. In particular, the UE 120 may only pre-fetch packets in order for one or more time resources at a time, instead of an entire TTI, and accordingly the buffer may only have a size to store one or more time resources instead of an entire TTI.

In the example of FIG. 9, as discussed, a particular packet (e.g., LC1_1) may be split across multiple layers (e.g., LC1_1a is allocated to layer 908 and LC1_1b is allocated to layer 910). In certain aspects, for a receiving device (e.g., eNB) to properly receive and process a TB, the TB needs to be independently self-decodable. Accordingly, the receiving device should not have to rely on information from one TB to decode another TB. Therefore, if a particular packet (e.g., LC1_1) is split across multiple TBs (e.g., LC1_1a is allocated to layer 908 of a first TB and LC1_1b is allocated to layer 910 of a second TB), in certain aspects, information (e.g., a header) is included in each TB the packet is split across indicating the size of the portion of the packet included in each TB. For example, in certain aspects, a first header is included in layer 908 of the first TB in time resource 1 corresponding to LC1_1a, and a second header is included in layer 910 of the second TB in time resource 1 for LC1_1b. Therefore, for a single packet LC1_1, two separate headers are transmitted. In certain aspects, the use of multiple headers for a single packet wastes transmission resources that could be used for other data.

Further, in some aspects, if there is insufficient space to include both the header for a portion of a packet and the portion of the packet in a particular time resource of a TB, the UE 120 may not be able to allocate the header or the portion of the packet to the time resource, and instead may just include padding bits, further wasting transmission resources. For example, if in the example shown in FIG. 9 the packet portion LC1_2b and corresponding header do not leave enough room in time resource 2 of layer 908 of the first TB for any portion of LC1_3 and a corresponding header, then UE 120 may add padding bits in time resource 2 of layer 908.

Figure 10:
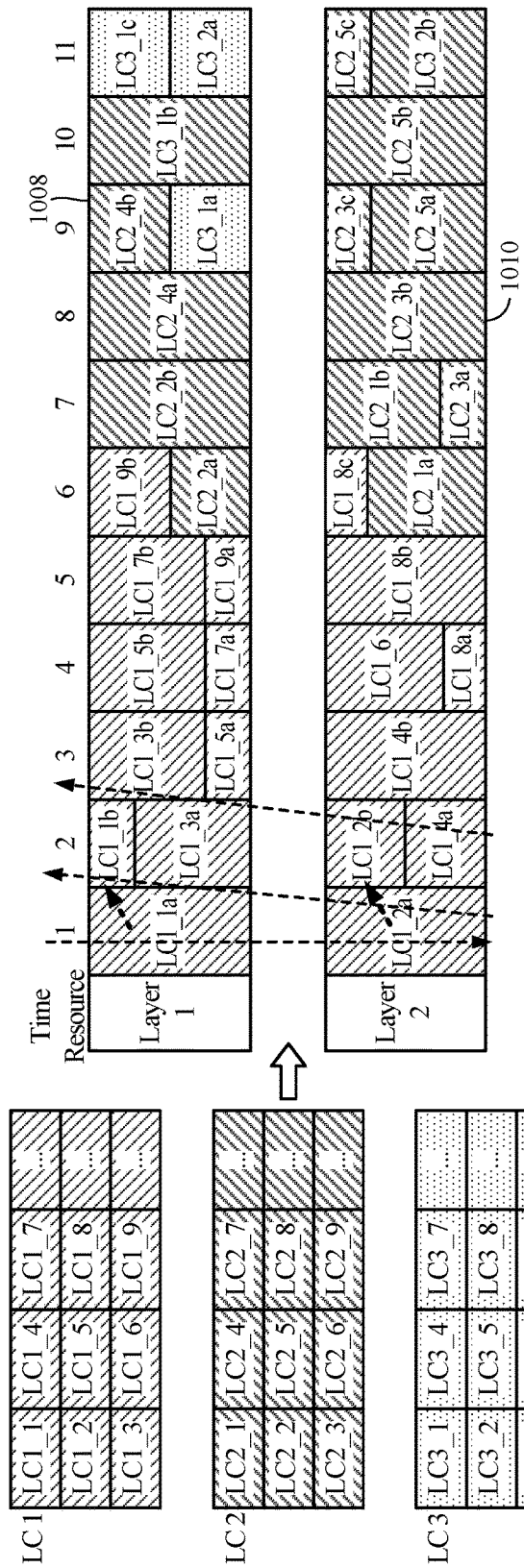
FIG. 10 illustrates an example of layers of one or more transport blocks, in accordance with certain aspects.

Accordingly, in some aspects, instead of splitting the allocation of a single packet across multiple layers of multiple TBs, the UE 120 splits packets across time resources of a single TB or layer to avoid RLC segmentation. In particular, if a certain packet cannot be allocated to a single time resource, the UE 120 allocates that packet across time resources of a single TB or layer. Accordingly, packets are still allocated across TBs or layers on a time resource by time resource basis, but certain portions of packets may not be allocated on a time resource by time resource basis. For example, FIG. 10 illustrates an example of layers 1008 and 1010 (e.g., of one or more TBs) built by the UE 120, in accordance with certain aspects. The UE 120 builds the layers 1008 and 1010 similar to layers 908 and 910 as described with respect to FIG. 9. In particular, the UE 120 begins by allocating first packet LC1_1 in order to time resource 1 of layer 1008. However, the entire packet LC1_1 cannot fit in time resource 1 of layer 1008. Therefore, unlike aspects described with respect to FIG. 9, UE 120 allocates the first portion LC1_1a to time resource 1 of layer 1008, and the second portion LC1_1b to time resource 2 of layer 1008. Further, the UE 120 allocates the next packet in order, LC2_1 to time resource 1 of layer 1010. Accordingly, in such aspects, since each packet is allocated to a single TB or layer, only a single header is needed for the packet in the TB or layer, instead of multiple headers, thereby reducing wasted transmission resources. For example, the UE 120 may include a single RLC header corresponding to packet LC1_1 in time resource 1 of layer 1008 that indicates the size of portions LC1_1a and LC1_1b across time resources 1 and 2 of layer 1008.

Figure 11:
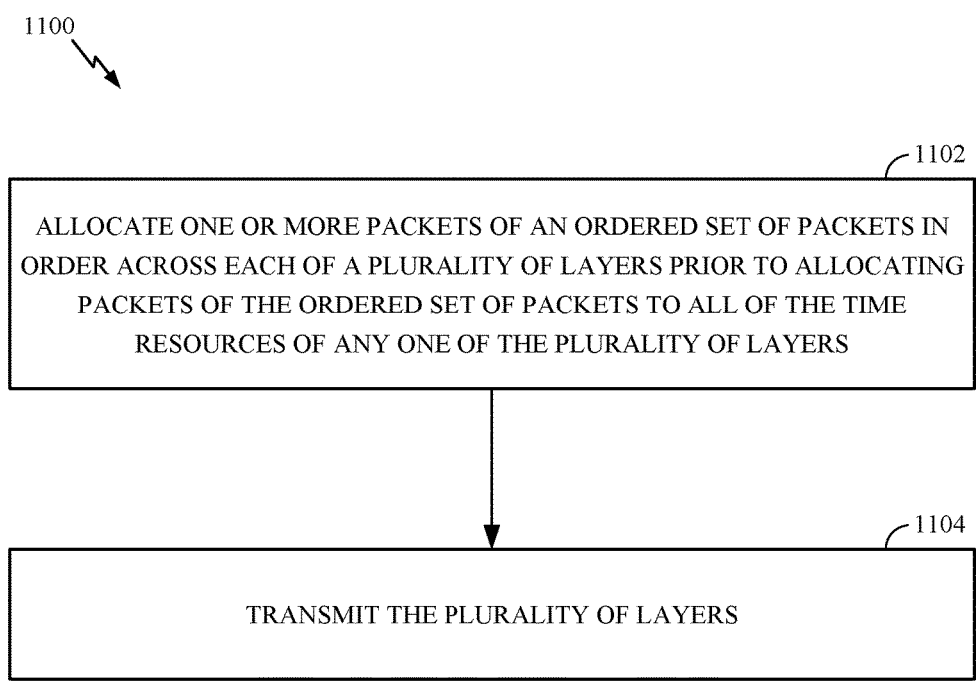
FIG. 11 illustrates example operations for wireless communications, for example, for generating and transmitting layers of one or more transport blocks, in accordance with certain aspects of the present disclosure.

FIG. 11 illustrates example operations 1100 for wireless communications, for example, for generating and transmitting layers of one or more transport blocks. According to certain aspects, operations 1100 may be performed by a user equipment (e.g., one or more of the UEs 120) or a BS (e.g., one or more of the BSs 110).

Operations 1100 begin at 1102 where the UE or BS allocates one or more packets of an ordered set of packets in order across each of a plurality of layers prior to allocating packets of the ordered set of packets to all of the time resources of any one of the plurality of layers. At 1104, the UE transmits the plurality of layers.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more of a transmit processor 420, a TX MIMO processor 430, a receive processor 438, or antenna(s) 434 of the base station 110 and/or the transmit processor 464, a TX MIMO processor 466, a receive processor 458, or antenna(s) 452 of the user equipment 120. Additionally, means for generating, means for allocating, and/or means for including may comprise one or more processors, such as the controller/processor 440 of the base station 110 and/or the controller/processor 480 of the user equipment 120.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and illustrated in FIG. 11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for allocating a plurality of packets to a plurality of layers across a plurality of time resources corresponding to a duration of a transport block, the plurality of layers comprising at least one of a plurality of frequency carriers or a plurality of spatial layers, the plurality of packets corresponding to a plurality of logical channels, the method comprising:
    determining an ordering of the plurality of packets, wherein the ordering is on a logical channel by logical channel basis, wherein all packets of one logical channel are added in order to the ordering before adding packets of another logical channel to the ordering;
    allocating packets of the plurality of packets in order of the ordering across each of the plurality of layers on a time resource by time resource basis in order of timing of the plurality of time resources, wherein packets are allocated to all of the plurality of layers in order of the ordering for one time resource before allocating packets to all of the plurality of layers in order of the ordering for another time resource; and
    transmitting the plurality of layers.

2. The method of claim 1, wherein the plurality of time resources comprise a plurality of symbols.

3. The method of claim 1, wherein each of the plurality of layers corresponds to a separate transport block.

4. The method of claim 1, wherein the plurality of layers correspond to a single transport block.

5. The method of claim 1, wherein the ordering indicates a first packet directly followed by a second packet, and wherein allocating the packets comprises:
    allocating at least a portion of the first packet to a first time resource on a first layer of the plurality of layers; and
    allocating at least a portion of the second packet to the first time resource on a second layer of the plurality of layers.

6. The method of claim 5, wherein allocating at least the portion of the first packet to the first time resource on the first layer comprises:
    allocating a first portion of the first packet to the first time resource on the first layer; and
    allocating a second portion of the first packet to a second time resource on the first layer.

7. The method of claim 6, further comprising including a first header in the first time resource on the first layer corresponding to the first portion and the second portion.

8. The method of claim 1, wherein allocating the packets comprises:

allocating a first portion of a first packet to a first time resource on a first layer of the plurality of layers; and allocating a second portion of the first packet to the first time resource on a second layer of the plurality of layers.

9. The method of claim 8, wherein the first layer corresponds to a first transport block, wherein the second layer corresponds to a second transport block, and further comprising including a first header in the first transport block corresponding to the first portion and a second header in the second transport block corresponding to the second portion.

10. A device comprising:
a memory; and
a processor, the memory and the processor being configured to:
  determine an ordering of a plurality of packets, the plurality of packets corresponding to a plurality of logical channels, wherein the ordering is on a logical channel by logical channel basis, wherein all packets of one logical channel are added in order to the ordering before adding packets of another logical channel to the ordering;
  allocate packets of the plurality of packets in order of the ordering across each of a plurality of layers on a time resource by time resource basis in order of timing of a plurality of time resources corresponding to a duration of a transport block, the plurality of layers comprising at least one of a plurality of frequency carriers or a plurality of spatial layers, wherein packets are allocated to all of the plurality of layers in order of the ordering for one time resource before allocating packets to all of the plurality of layers in order of the ordering for another time resource; and
  transmit the plurality of layers.

11. The device of claim 10, wherein the plurality of time resources comprise a plurality of symbols.

12. The device of claim 10, wherein each of the plurality of layers corresponds to a separate transport block.

13. The device of claim 10, wherein the plurality of layers correspond to a single transport block.

14. The device of claim 10, wherein the ordering indicates a first packet directly followed by a second packet, and wherein to allocate the packets comprises to:
  allocate at least a portion of the first packet to a first time resource on a first layer of the plurality of layers; and
  allocate at least a portion of the second packet to the first time resource on a second layer of the plurality of layers.

15. The device of claim 14, wherein to allocate at least the portion of the first packet to the first time resource on the first layer comprises to:
  allocate a first portion of the first packet to the first time resource on the first layer; and
  allocate a second portion of the first packet to a second time resource on the first layer.

16. The device of claim 15, wherein the processor is further configured to include a first header in the first time resource on the first layer corresponding to the first portion and the second portion.

17. The device of claim 10, wherein to allocate the packets comprises to:
  allocate a first portion of a first packet to a first time resource on a first layer of the plurality of layers; and
  allocate a second portion of the first packet to the first time resource on a second layer of the plurality of layers.

18. The device of claim 17, wherein the first layer corresponds to a first transport block, wherein the second layer corresponds to a second transport block, and wherein the processor is further configured to include a first header in the first transport block corresponding to the first portion and a second header in the second transport block corresponding to the second portion.

19. A device comprising:
  means for determining an ordering of a plurality of packets, the plurality of packets corresponding to a plurality of logical channels, wherein the ordering is on a logical channel by logical channel basis, wherein all packets of one logical channel are added in order to the ordering before adding packets of another logical channel to the ordering;
  means for allocating packets of the plurality of packets in order of the ordering across each of a plurality of layers on a time resource by time resource basis in order of timing of a plurality of time resources corresponding to a duration of a transport block, the plurality of layers comprising at least one of a plurality of frequency carriers or a plurality of spatial layers, wherein packets are allocated to all of the plurality of layers in order of the ordering for one time resource before allocating packets to all of the plurality of layers in order of the ordering for another time resource; and
  means for transmitting the plurality of layers.

20. The device of claim 19, wherein the plurality of time resources comprise a plurality of symbols.

21. The device of claim 19, wherein each of the plurality of layers corresponds to a separate transport block.

22. The device of claim 19, wherein the plurality of layers correspond to a single transport block.

23. A computer readable medium having instructions stored thereon for performing a method for allocating a plurality of packets to a plurality of layers across a plurality of time resources corresponding to a duration of a transport block, the plurality of layers comprising at least one of a plurality of frequency carriers or a plurality of spatial layers, the plurality of packets corresponding to a plurality of logical channels, the method comprising:
  determining an ordering of the plurality of packets, wherein the ordering is on a logical channel by logical channel basis, wherein all packets of one logical channel are added in order to the ordering before adding packets of another logical channel to the ordering;
  allocating packets of the plurality of packets in order of the ordering across each of the plurality of layers on a time resource by time resource basis in order of timing of the plurality of time resources, wherein packets are allocated to all of the plurality of layers in order of the ordering for one time resource before allocating packets to all of the plurality of layers in order of the ordering for another time resource; and
  transmitting the plurality of layers.

24. The computer readable medium of claim 23, wherein the plurality of time resources comprise a plurality of symbols.

25. The computer readable medium of claim 23, wherein each of the plurality of layers corresponds to a separate transport block.

26. The computer readable medium of claim 23, wherein the plurality of layers correspond to a single transport block.

* * * * *